(12) United States Patent  
Mintz et al.

(10) Patent No.: US 9,007,531 B2
(45) Date of Patent: Apr. 14, 2015

(54) METHODS AND APPARATUS FOR EXPANDING A FIELD OF VIEW IN A VIDEO COMMUNICATION SESSION

(71) Applicant: Vonage Network LLC, Holmdel, NJ (US)

(72) Inventors: Ido Mintz, Burgata (IL); Itay Bianco, Tel Aviv (IL); Baruch Sterman, Efrat (IL); Sagie Machlin, Rishon Lezion (IL); Tzahi Efrati, Hoboken, NJ (US)

(73) Assignee: Vonage Network LLC, Holmdel, NJ (US)

( * ) Notice: Subject to any disclaimer, the term of this patent is extended or adjusted under 35 U.S.C. 154(b) by 45 days.

(21) Appl. No.: 14/011,909

(22) Filed: Aug. 28, 2013

(65) Prior Publication Data

US 2015/0062283 A1 Mar. 5, 2015

(51) Int. Cl.
*H04N 5/66* (2006.01)
*H04N 7/14* (2006.01)

(52) U.S. Cl.
CPC ..................................... *H04N 7/141* (2013.01)

(58) Field of Classification Search
USPC ............................................ 348/739, E5.058
See application file for complete search history.

(56) References Cited

U.S. PATENT DOCUMENTS

| | | | |
|---|---|---|---|
| 5,430,473 A * | 7/1995 | Beecher et al. | 348/14.05 |
| 5,903,317 A * | 5/1999 | Sharir et al. | 348/589 |
| 6,297,853 B1 * | 10/2001 | Sharir et al. | 348/589 |

* cited by examiner

*Primary Examiner* — Creighton Smith
(74) *Attorney, Agent, or Firm* — Moser Taboada; Joseph Pagnotta (57) ABSTRACT

Methods and apparatus for expanding a field of view of an image during a video communication session. In some embodiments, a method includes transmitting a first video image having a first field of view during the video telecommunication session. The methods and apparatus further capturing a first set of background images, at least some of which are combined to form a first composite background image having a second field of view that is greater than the first field of view. Further, superimposing at least a portion of the first video image over the first composite background image to form a second video image having a same field of view as the first composite background image and transmitting the second video image during the video telecommunication session.

23 Claims, 7 Drawing Sheets

METHODS AND APPARATUS FOR EXPANDING A FIELD OF VIEW IN A VIDEO COMMUNICATION SESSION

BACKGROUND OF THE INVENTION

1. Field of the Invention

Embodiments consistent with the present invention generally relate to methods, apparatus, and systems for expanding a field of view during video communication sessions.

2. Description of the Related Art

The proliferation of cellular phones and smart phones into society allow people to communicate instantly from almost anywhere. Increased bandwidth and efficiency in data compression algorithms have allowed mobile devices equipped with cameras to stream video based communication sessions.

However, current internal cameras in mobile phones are limited in the field of view that they can capture at one time. In such devices, recipients of a video stream (for example, during a video conference call) may receive only the limited field of view captured by the sending device even though the sender wishes to show a much wider view including more of the sender's background. In addition, while in a call, mobile phone cameras may be used with a different orientation and/or aspect ratio than the screens on which they are shown on the recipient. For example, when capturing a portrait image/video from a camera onto a landscape view on the recipient, the sent image/video will be cropped, and/or utilize a limited portion of the viewing window.

Accordingly, there is a need for a method, apparatus, and system for expanding a viewing area in a video communication session.

SUMMARY OF THE INVENTION

Methods and apparatus for expanding a field of view of an image during a video communication session. In some embodiments, a method includes transmitting a first video image having a first field of view during a video telecommunication session. The method further capturing a first set of background images, at least some of which are combined to form a first composite background image having a second field of view that is greater than the first field of view. Further, superimposing at least a portion of the first video image over the first composite background image to form a second video image having a same field of view as the first composite background image and transmitting the second video image during the video telecommunication session.

In some embodiments, a method for expanding a field of view of an image for use in a video communication session includes capturing a first set of one or more background images. The method further includes combining at least some of the one or more background images to form a first composite background image having a first field of view. The method includes capturing a first video image having a second field of view that is smaller than the first field of view and superimposing at least a portion of the first video image over the first composite background image to form a second video image having a same field of view as the first composite background image. The method then establishes a video communication session and transmits the second video image during the video communication session.

In some embodiments, an apparatus for expanding field of view of an image during a video communication session including at least one processor, at least one input device, at least one display screen, at least one camera, at least one storage device storing processor-executable instructions which, when executed by the at least one processor, performs a method. The method includes transmitting a first video image having a first field of view during a video telecommunication session and capturing via the at least one camera, a first set of background images, at least some of which are combined to form a first composite background image having a second field of view that is greater than the first field of view. The method further includes superimposing at least a portion of the first video image over the first composite background image to form a second video image having a same field of view as the first composite background image and transmitting the second video image during the video telecommunication session.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention are directed to methods, apparatus, and systems for expanding a field of view during video communication sessions.

Figure 1:
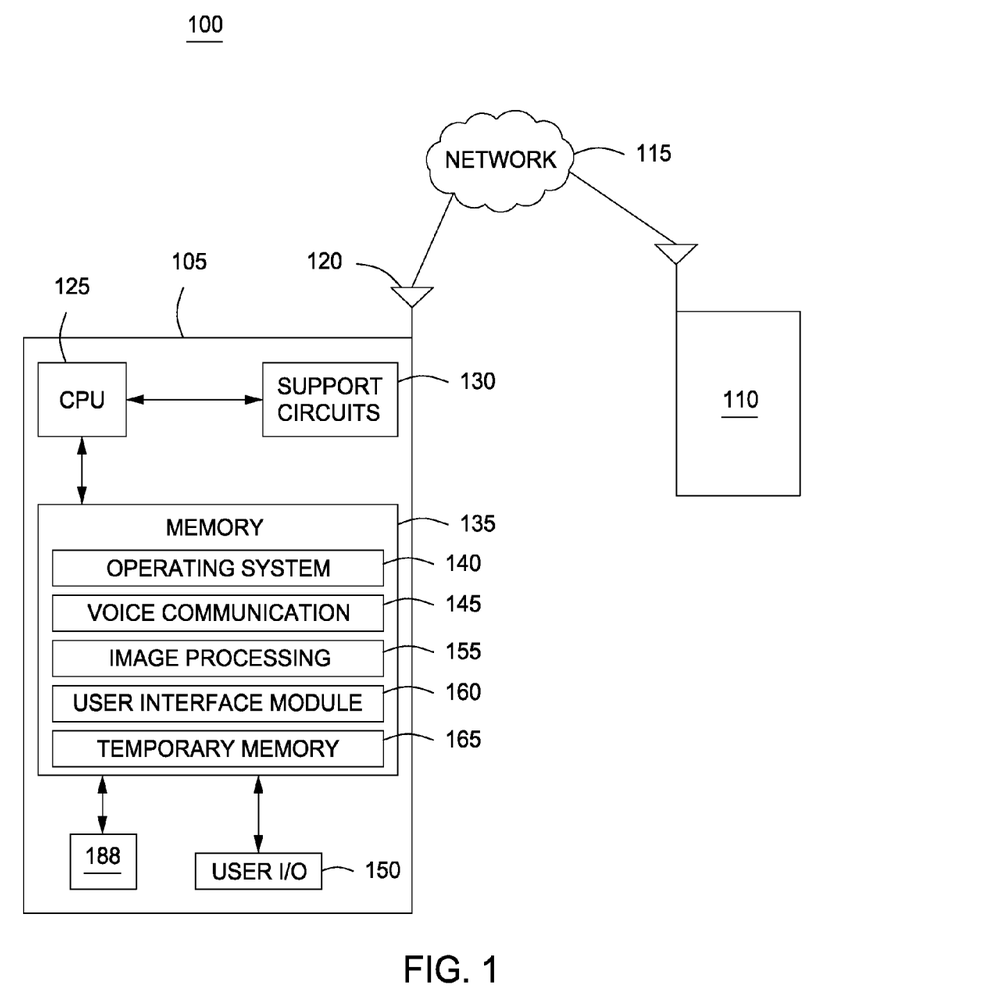
FIG. 1 is an illustration of a communication system including a first terminal and at least one second terminal in accordance with one or more exemplary embodiments of the invention.

FIG. 1 is an illustration of a communication system 100 including a first user device or terminal 105 and at least one second user device or terminal 110 in accordance with one or more exemplary embodiments of the invention. The exemplary mobile communication system 100 comprises a communications network 115, the first terminal 105, and the second terminal 110. The two terminals are connected to the communications network 115 that may use Session Initiation Protocol (SIP), Voice over Internet Protocol (VoIP), and the like to form a voice call session. The connection may be wired or wireless. The communications network 115 may be one or more networks such as Internet Protocol (IP) networks or public switched telephone networks (PSTN) used to connect the first 105 and second terminals 110. The first and second terminals (105, 110) may be electronic user devices (e.g., telephones, personal computers, laptops, smart phones, mobile phones, tablets, and the like).

The communications network 115 allows for user devices (wired or wireless) to exchange data and voice communications. Since video or images captured by the camera are digitized for sending across the network 115, video calls are a form of data communication. The communications network 115 is capable of processing the sending and receiving of both and voice and data streams between the first terminal 105 and the second terminal 110. The first terminal 105 includes an antenna 120, a CPU 125, support circuits 130, memory 135, input/output (I/O) interface 150, and at least one camera 188. Some embodiments may include more than one camera on the respective terminals (105, 110). The support circuits 130 include circuits for interfacing the CPU 125 and memory 135 with the antenna 120 and input/output interface 150. The I/O interface 150 may include a speaker, microphone, additional camera optics, touch screen, buttons and the like for a user to interact with the first terminal 105.

The memory 135 includes an operating system 140, a communication module 145, an image processing module 155, a user interface module 160, and a temporary memory module 165. The operating system 140 controls the interoperability of the support circuits 130, CPU 125, memory 135, and the I/O interface 150. The user interface module 160 contains instructions for the I/O interface 150 to interact with the operating system 140 such as for a graphical user interface (GUI). The voice communication module 145 may establish a communication session via cellular communication (CDMA, GSM, etc.).

The image processing module 155 processes image and video captures from the camera 188 and optionally other optics. The image processing module 155 uses local feature detection algorithms such as Scale-invariant feature transform (SIFT) or Speeded Up Robust Features (SURF) to stitch individual images. The details and functionality of SIFT may be found in a publication entitled "Recognising Panoramas", Proceedings of the ninth IEEE International Conference on Computer Vision 2. pp. 1218-1225. The details and functionality of SURF may be found in an article entitled "SURF: Speeded Up Robust Features", Computer Vision and Image Understanding (CVIU), Vol. 110, No. 3, pp. 346-359, (2008). Stitched images are combined to form a panoramic view of the current operating background of the user. In some embodiments, the panoramic view provides more details of the user background or environment and comprises a larger area than the individually captured images.

The image processing module 155 also performs image processing algorithms to isolate and extract people intended to participate in the video communication session. For example, the image processing module 155 may compute basic facial recognition to recognize someone is facing the camera 188 and will be participating in a video communication session. In some embodiments, the person may be tagged for future video tracking or video capture. Further embodiments may include motion tracking algorithms and video capture to isolate video of solely the user. The image processing module 155 then can overlay the video of the user(s) onto the stitched panoramic image such that the combined video and background image may be sent to a recipient over the network 115 as an expanded video.

Extraction, tracking, and user recognition algorithms may include feature extraction using histogram analysis and processing with support vector machines (SVMs) by the image processing module 155. The algorithms allow facial, posture, and in alternative embodiments, voice recognition and tracking in the user environment. For user background environments with many people, the image processing module 155 may use skeleton thinning algorithms and human leg detection algorithms. In additional embodiments, optical elements such as infrared cameras may be used for sensing and tracking data.

Figure 2A:
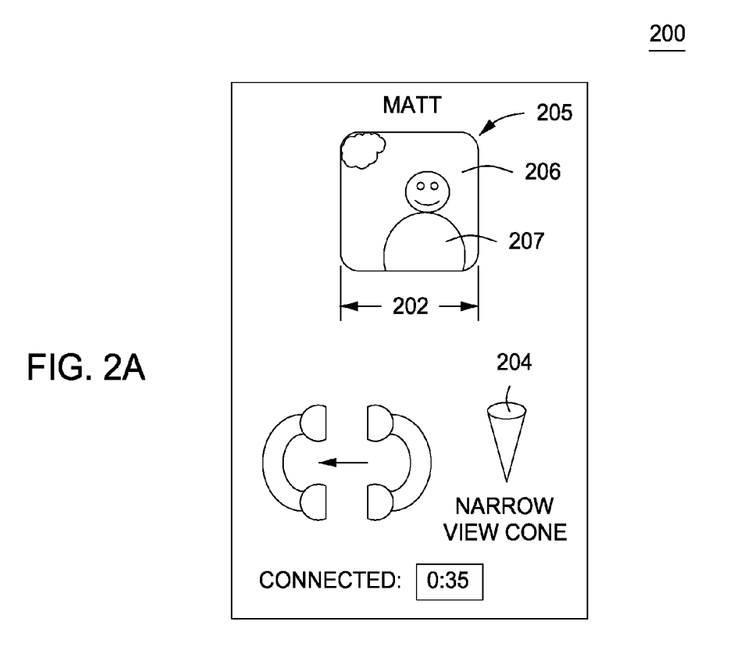
FIGS. 2A, 2B, 2C, and 2D are illustrations of exemplary GUIs for modifying a video stream on a terminal in accordance with one or more embodiments of the invention.

FIGS. 2A, 2B, 2C, and 2D are illustrations of an exemplary GUI for modifying a video stream on a terminal in accordance with one or more embodiments of the invention. FIG. 2A illustrates a GUI 200 wherein a user streaming video 205 is being received at a standard area or narrow-angle camera view as part of a video communication session across the network 115. The narrow view has a field of view width 202. In some embodiments, the video 205 is marked as a narrow cone view 204. In some embodiments, user video 205 may be shown on the user device (terminal 105) as well as the intended recipient (terminal 110). The video 205 may be captured by a camera having a limited image capture viewing cone and in many instances will be comprised mostly of the user near the terminal 105. The video 205 is of a small area or dimension, and in some embodiments resembles a portrait orientation. The streaming video 205 includes a background 206 and at least one foreground object 207. In FIG. 2A, the foreground object 207 is an exemplary participant of the video communication session.

Figure 2B:
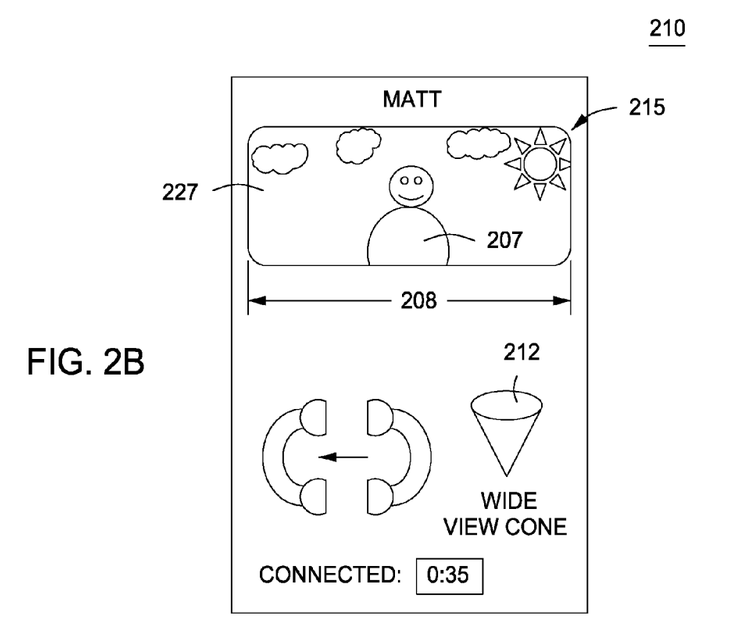

FIG. 2B illustrates a GUI 210 with a modified panoramic video image 215. The panoramic video image 215 is formed from the methods described in further details below in FIGS. 3-5. The panoramic video image 215, when viewed in conjunction with the video image 205, provides additional background detail and improves the viewer experience by placing the viewed user in an increased environment context. The video image 215 is expanded when viewed in conjunction with video image 205 to a larger field of view of width 208. In some embodiments, the panoramic video image 215 may include an indicator 212 of a wide view cone perspective. The panoramic video image 215 simulates a wide angle view cone from substantially the same center of perspective as that in video 205 for an simulated enhanced angle of view. Angle of view describes the angular extent of a given scene that is imaged by a camera and is used herein interchangeably with the term field of view In some embodiments, the panoramic video image 215 comprises a stitched background image 227 that may be recaptured or refreshed repeatedly during the duration of the video communication session. By using a still background that is panoramic, the viewer of the video is given the impression of a wide angle video. Furthermore, there is a decrease in bandwidth consumption since a still image comprises much of the background.

Figure 2C:
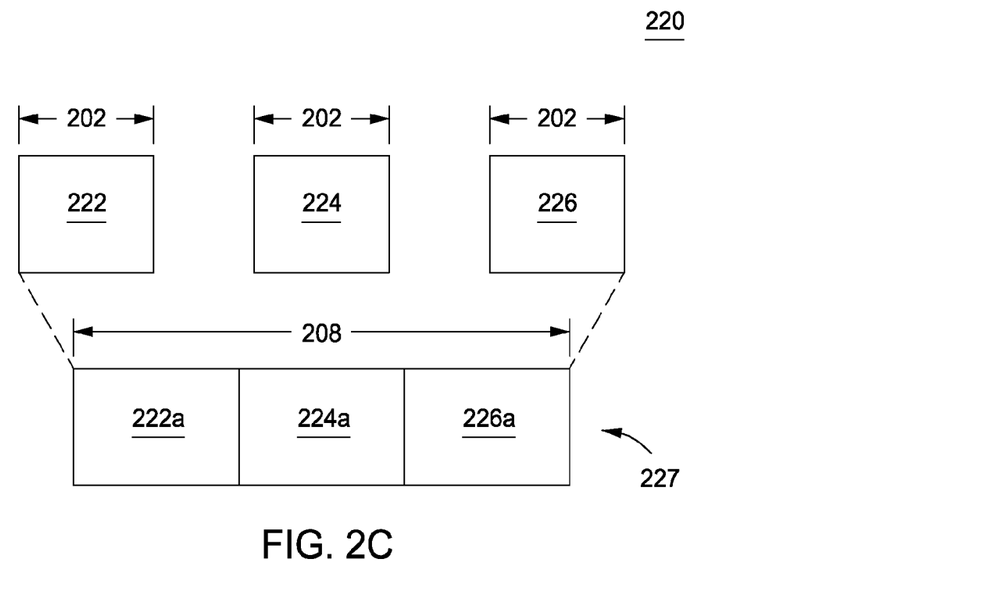

FIG. 2C illustrates a box diagram 220 of elements for forming the stitched background image 227. A series of still images (222, 224, 226) of a narrow field of view 202 are captured using the camera 188. The still images (222, 224, 226) are combined using edge detection and other image integration algorithms that are modified or cropped to form a continuous wide panoramic view of width 208 comprising the modified images (222a, 224a, 226a). The expanded panoramic view providing environmental details found in each of the individual still images (222, 224, 226) simultaneously.

In other embodiments, a portion of the panoramic background (e.g., 224a) may comprise predetermined looped video capture (e.g., 2 seconds) such that portions of the background artificially appear to have movement. While video of the users in the foreground continues as a live stream overlaid onto the background. For example, in the expanded view, video of a user standing near a waterfall, the user video is streamed live overlaid and integrated into the background of the waterfall. In such an example, the waterfall may be in loop (e.g., 5 seconds) while the surrounding foliage environment is a still image.

Figure 2D:
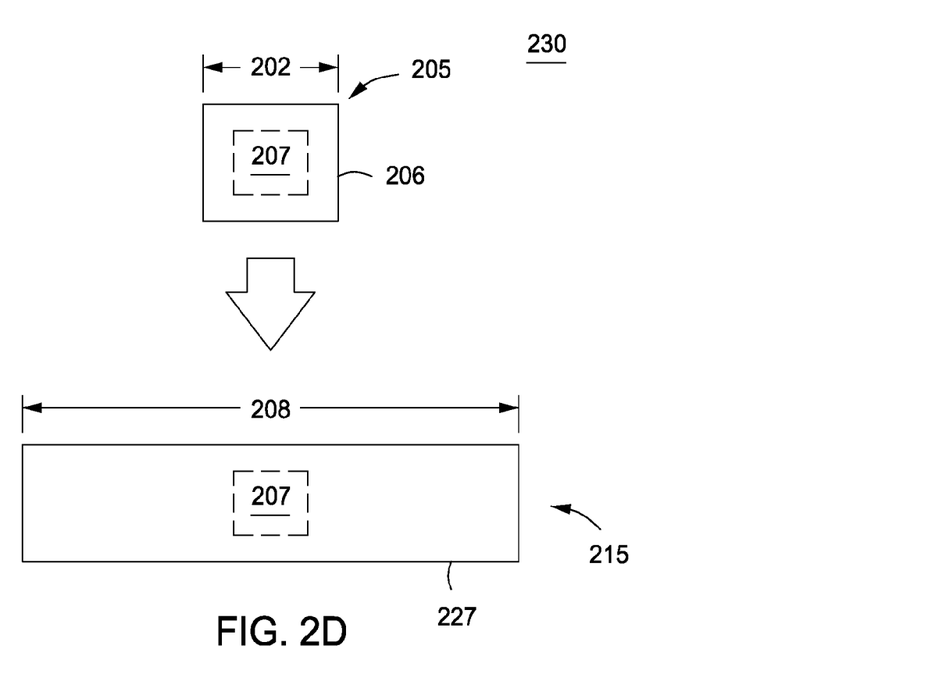

FIG. 2D illustrates a box diagram 230 of extracting a foreground 207 from the video stream 205 of a narrow field of view of width 202. The extracted foreground object 207 is then a superimposed onto the stitched background image 227. The resultant panoramic image 215 provides an expanded field of view of the foreground object 207 with a background of greater detail than the background 206. The foreground object 207 may be edited such to align correctly with the stitched background image using algorithms to simulate a realistic wide angle field of view. In some embodiments, the foreground object 207 may be moved along the stitched background image 227 to simulate panning.

Figure 3:
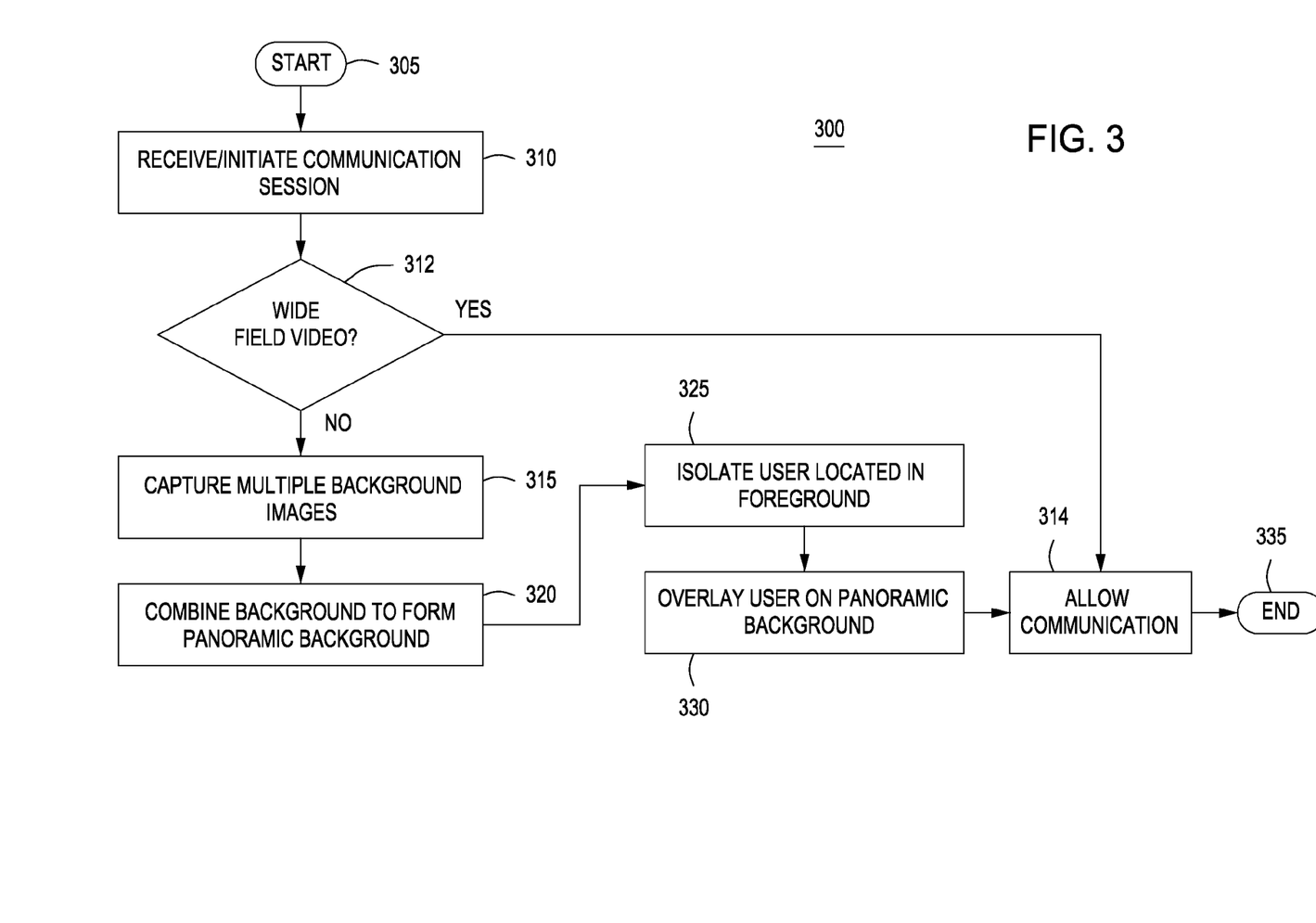
FIG. 3 is a flow diagram of an exemplary method for recognizing a narrow angle video on a user device in accordance with one or more embodiments of the invention.

FIG. 3 is a flow diagram of an exemplary method 300 for recognizing a narrow angle video on a user device in accordance with one or more embodiments of the invention. The narrow angle video has a total frame area of smaller dimensions than the total frame area processed expanded image.

The method 300 begins at step 305 and continues to step 310 wherein a video communication session request is received or initiated by a first terminal 105. At 312, the image capture angle of the first terminal 105 is determined. If, at step 312, the method 300 determines the first terminal 105 is capable of expanded field of view using a wide angle camera, the communication session is established using the wide angle video camera at step 314. Thus, the method 300 determines an expanded field of view is not necessary and the method 300 then ultimately ends at step 335. In alternative embodiments, expanded field of view may be selected with a wide angle video camera to reduce usage of transmission bandwidth.

However, if no wide angle video capability is discovered, the method 300 continues to step 315. At step 315, multiple background images are captured. In some embodiments, the first terminal 105 may prompt a user to use the camera to pan the environment of the user. The method 300 then continues to step 320, where the captured images are combined to form a panoramic background of the environment surrounding the user. The captured images may be stitched together to form an expanded field of view of the user environment. Next, at step 325, video of the user is isolated in the foreground as a video object by the image processing module 155 using tracking or facial recognition algorithms. Then at step 330, the isolated video object of the user is integrated and overlaid/superimposed on the panoramic background. The method 300 continues to step 314 where the video communication session is established (or updated if already established) using the superimposed panoramic background as part of a video communication session. In some embodiments, the video stream and panoramic background are sent separately across the network 115 and combined on the recipient device (e.g., second terminal 110). The method 300 then ends at step 335.

Figure 4:
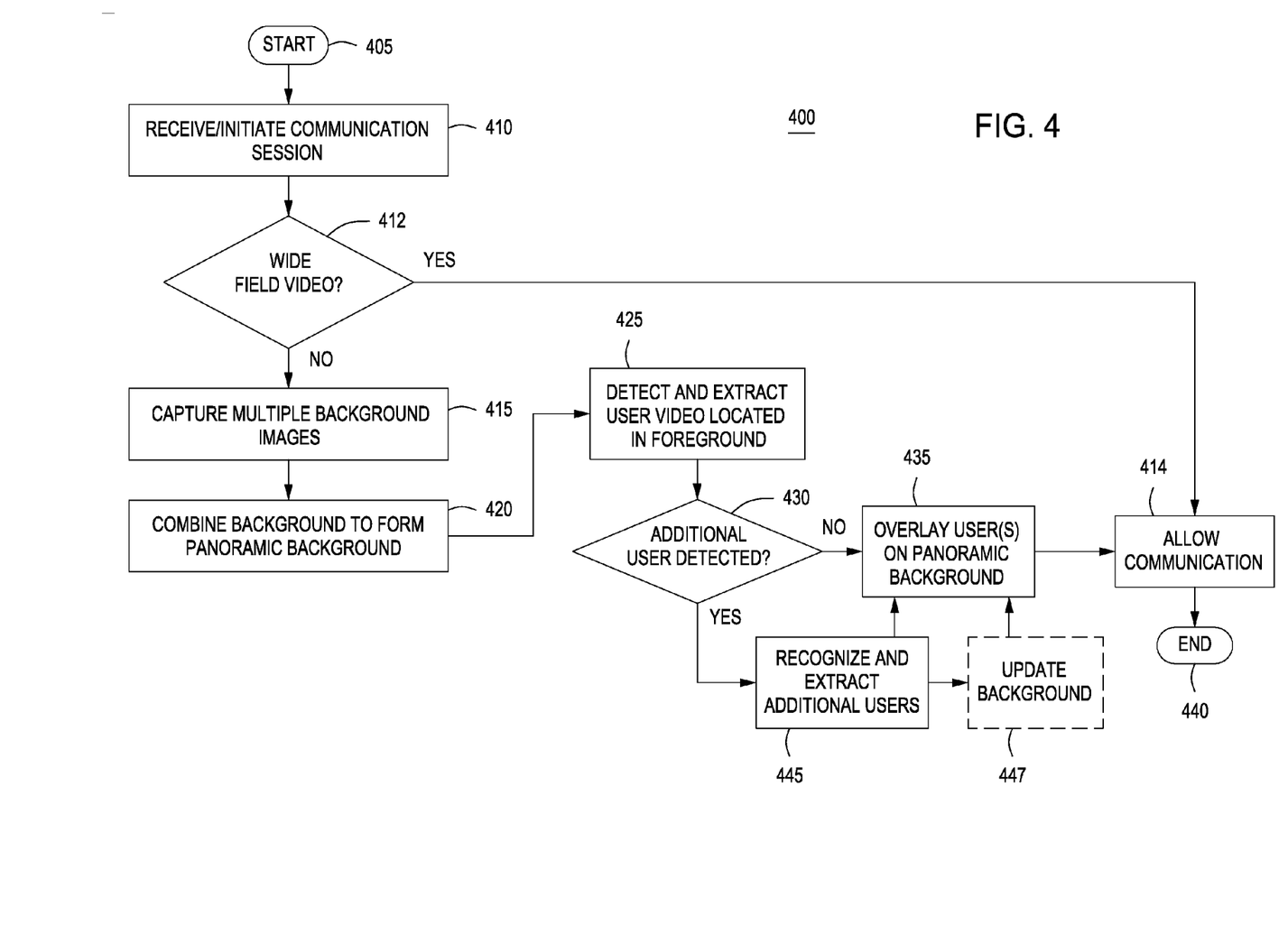
FIG. 4 is a flow diagram of an exemplary method for recognizing a narrow angle video on a user device with multiple people in accordance with one or more embodiments of the invention.

FIG. 4 is a flow diagram of an exemplary method 400 for recognizing a narrow angle video on a user device with multiple people in accordance with one or more embodiments of the invention. The method 400 begins at step 405 and continues to step 410 where a video communication session request is received or initiated by a first terminal 105. The method 400 then continues to step 412 where the image capture angle of the first terminal 105 is determined. If, at 412, it is determined that the first terminal 105 is capable of capturing wide angle video on a wide angle camera (e.g., if camera 188 is a wide angle camera), the communication session is established using the wide angle video camera at step 414. The method determines an expanded field of view is not necessary and the method 400 then ends at step 440.

However, if no wide angle video capability is discovered, the method 400 continues to step 415. At step 415, multiple background images are captured. In some embodiments, the first terminal 105 may prompt a user to use the camera to pan the environment of the user. The method 400 then continues to step 420 where the captured images are combined to form a panoramic background of the environment surrounding the user. The captured images may be stitched together to form an expanded view of the user environment. Next, at step 425, video of the user is isolated in the foreground by the image processing module 155 using tracking or facial recognition algorithms. The method 400 then continues to step 430 where it is determined whether additional users are present. In some embodiments, additional users may be detected via facial recognition algorithms or manual selection of users on the terminal 105. For example, the image processing module 155 of the terminal 105 may detect two out of five people are facing the camera 188. Thus, the two people would be automatically recognized as present participants in a video communication session. In some embodiments, the terminal 105 may prompt the user to confirm participants. If no additional users are detected, the method 400 continues to step 435 where the captured user video is superimposed on the panoramic background.

If additional users are detected at step 430 the method 400 continues to step 445. At step 445, the image processing module 155 uses image analysis to recognize and extract additional users. In some embodiments, recognized users may be compared to a previously stored image and assigned to a pre-determined profile. In such embodiments, the user can thus have a super imposed label on the video communication session. In some embodiments, the additional users may be assigned individual video streams for processing by the video processing module 155 and sending across the network 115. The video streams may thus be sent separately across the network 115 and combined for the intended recipient on the second terminal 110.

In some embodiments, the background may optionally be updated at step 447 by either re-capturing and stitching a panoramic background, or by capturing and replacing a portion of the existing panoramic background of detected additional users. The method 400 then continues to step 435 where the users are overlaid on the panoramic background. The method 400 continues to step 414 where the video communication session is established with the wide angle images, or if the communication session is be already established at step 410, update the telecommunication session using the expanded view images captured/created. The method then ends at step 440.

Figure 5:
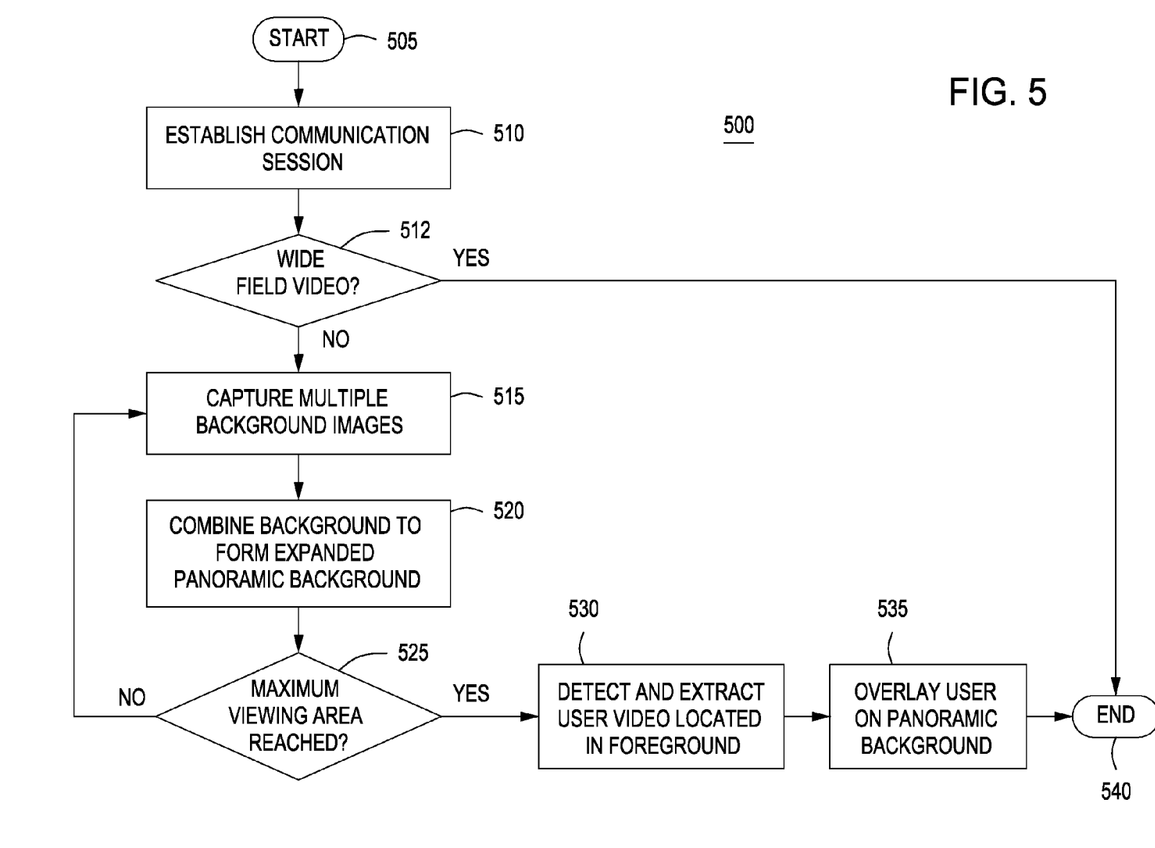
FIG. 5 is a flow diagram of an exemplary method for recognizing a narrow angle video on a user device and expanding a field of view in accordance with one or more embodiments of the invention.

FIG. 5 is a flow diagram of an exemplary method 500 for recognizing a narrow angle video on a user device and expanding a field of view in accordance with one or more embodiments of the invention. The narrow angle video includes a smaller field of view and includes less of background environment being captured than the expanded field of view formed through image processing.

The method 500 begins at step 505 and continues to step 510 where a video communication session request is established between the first terminal 105 and second terminal 110 across the network 115. The method 500 then continues to step 512 to determine whether the first terminal 105 has a camera 188 that is capable of wide angle video. If the method 500 determines wide angle video is available, the method 500 allows the communication session to be established using the wide angle video camera and the method 300 then ends at step 540. In alternative embodiments, expanded view may be selected with a wide angle video camera to reduce usage of transmission bandwidth.

However, if no wide angle video capability is discovered, the method 500 continues to step 515. At step 515 multiple background images are captured. In some embodiments, the first terminal 105 may prompt a user to use the camera to pan the environment of the user for step 515. The method 500 then continues to step 520 where the captured images are combined to form a panoramic background of the environment surrounding the user. The panoramic background providing an expanded field of view of the user environment. Next, at step 525, it is determined whether the maximum viewing area of the viewing device (e.g., second terminal 110) has been achieved. If at step 525, the maximum viewing area has not been reached, either known dimensions of the viewing area of the second terminal 110 is selected, or a desired dimensions are requested from the second terminal 110. Dimensions herein may refer to resolution, screen/display size, aspect ratio, and the like to expand the field of view.

The method 500 then returns back to step 515 to retrieve images for the updated image area. The method 500 continues at step 530 if it is determined that a maximum area has been achieved. At step 530, the user video located in the foreground is detected and extracted. The video of the user is isolated in the foreground by the image processing module 155 using motion tracking or facial recognition algorithms. Next, at step 535, the user video is overlaid onto and integrated with the panoramic background and prepared for the video communication session. The method 500 then ends at step 540.

In alternative embodiments, the camera 188 may be panned with respect to the live streaming video of the user overlaid on the expanded panoramic view. In such embodiments, the viewer or recipient device may see extracted live video of the user with varying views of the expanded panoramic view.

FIGS. 3-5 disclose methods that may be recombined with one another to resize and expand the background of a user video. The methods (300, 400, 500) have various steps of video and image processing that in some embodiments occur entirely on end-user devices (e.g., first and second terminals 105 and 110). However, alternative embodiments may include some if not all image processing occurring in real-time by servers across the network 115.

Figure 6:
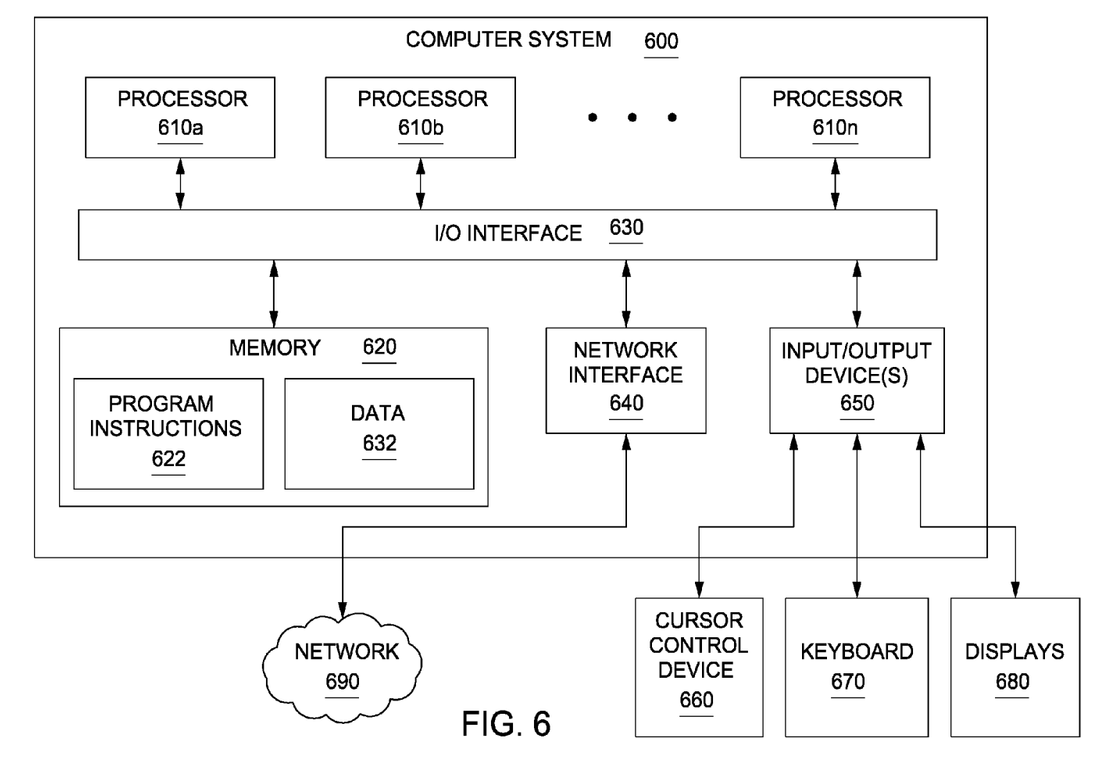
FIG. 6 is a depiction of a computer system that can be utilized in various embodiments of the present invention.

FIG. 6 is a depiction of a computer system 600 that can be utilized in various embodiments of the present invention. The computer system 600 comprises substantially similar structure comprising servers or electronic devices in the aforementioned embodiments.

Various embodiments of methods and system authenticating users for communication sessions, as described herein, may be executed on one or more computer systems, which may interact with various other devices. One such computer system is computer system 600 illustrated by FIG. 6, which may in various embodiments implement any of the elements or functionality illustrated in FIGS. 1-5. In various embodiments, computer system 600 may be configured to implement methods described above. The computer system 600 may be used to implement any other system, device, element, functionality or method of the above-described embodiments. In the illustrated embodiments, computer system 600 may be configured to implement methods 300 400, and 500 as processor-executable executable program instructions 622 (e.g., program instructions executable by processor(s) 610) in various embodiments.

In the illustrated embodiment, computer system 600 includes one or more processors 610*a*-610*n* coupled to a system memory 620 via an input/output (I/O) interface 630. Computer system 600 further includes a network interface 640 coupled to I/O interface 630, and one or more input/output devices 660, such as cursor control device 660, keyboard 670, and display(s) 680. In some embodiments, the keyboard 670 may be a touchscreen input device.

In various embodiments, any of the components may be utilized by the system to authenticate a user as described above. In various embodiments, a user interface may be generated and displayed on display 680. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements. In another example, multiple nodes may implement computer system 600 in a distributed manner.

In different embodiments, computer system 600 may be any of various types of devices, including, but not limited to, personal computer systems, mainframe computer systems, handheld computers, workstations, network computers, application servers, storage devices, a peripheral devices such as a switch, modem, router, or in general any type of computing or electronic device.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs). In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 690), such as one or more external systems or between nodes of computer system 600. In various embodiments, network 690 may include one or more networks including but not limited to Local Area Networks (LANs) (e.g., an Ethernet or corporate network), Wide Area Networks (WANs) (e.g., the Internet), wireless data networks, cellular networks, Wi-Fi, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, cameras, touchpads, touchscreens, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the methods described above, such as the methods illustrated by the flowchart of FIGS. 3, 4, and 5. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, smartphones, tablets, PDAs, wireless phones, pagers, and the like. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A method for expanding a field of view of an image during a video communication session, comprising:
    transmitting a first video image having a first field of view during the video communication session;
    capturing a first set of background images, at least some of which are combined to form a first composite background image having a second field of view that is greater than the first field of view;
    superimposing at least a portion of the first video image over the first composite background image to form a second video image having a same field of view as the first composite background image; and
    transmitting the second video image during the video communication session.

2. The method of claim 1, wherein the first composite background image is a still image.

3. The method of claim 1, wherein the first composite background image is a composite of at least some of the first set of background images stitched together using edge detection algorithms to form a panoramic background image.

4. The method of claim 1, wherein the first composite background image is a looped video image that replays itself to create a live video effect.

5. The method of claim 1, wherein the first video image is superimposed over the first composite background image.

6. The method of claim 5, wherein the first video image includes one or more visual features, wherein the first composite background image includes one or more visual features, and wherein integrating the first video image with the first composite background image includes aligning at least some of the one or more visual features of the first video image with matching visual features of the first composite background image.

7. The method of claim 1, wherein one or more foreground objects are extracted from the first video image, and wherein the one or more foreground objects extracted includes one or more participants of the video communication session.

8. The method of claim 7, wherein the one or more participants are automatically recognized using one or more of facial recognition algorithms or human recognition algorithms.

9. The method of claim 7, wherein the one or more participants are manually identified by a participant of the video communication session.

10. The method of claim 1, further comprising:
capturing a second set of one or more background images;
combining at least some of the second set of one or more background images with the first composite background image to create a second composite background image having a field of view that is greater than the second field of view;
superimposing at least a portion of the first video image over the second composite background image to form a second video image having a same field of view as the second composite background image; and
transmitting the second video image during the video communication session.

11. A method for expanding a field of view of an image for use in a video communication session, comprising:
capturing a first set of one or more background images;
combining at least some of the one or more background images to form a first composite background image having first field of view;
capturing a first video image having a second field of view that is smaller than the first field of view;
superimposing at least a portion of the first video image over the first composite background image to form a second video image having a same field of view as the first composite background image;
establishing a video communication session; and
transmitting the second video image during the video communication session.

12. The method of claim 11, wherein the first composite background image is a still image.

13. The method of claim 11, wherein the first composite background image is a composite of at least some of the first set of background images stitched together using edge detection algorithms to form a panoramic background image.

14. Apparatus for expanding field of view of an image during a video communication session, comprising:
a) at least one processor;
b) at least one input device;
c) at least one display screen;
d) at least one camera; and
e) at least one storage device storing processor-executable instructions which, when executed by the at least one processor, performs a method including
 i. transmitting a first video image having a first field of view during a video telecommunication session;
 ii. capturing via the at least one camera, a first set of background images, at least some of which are combined to form a first composite background image having a second field of view that is greater than the first field of view;
 iii. superimposing at least a portion of the first video image over the first composite background image to form a second video image having a same field of view as the first composite background image; and
 iv. transmitting the second video image during the video telecommunication session.

15. The apparatus of claim 14, wherein the first composite background image is a still image.

16. The apparatus of claim 14, wherein the first composite background image is a composite of at least some of the one or more background images stitched together using edge detection algorithms to form a panoramic background image.

17. The apparatus of claim 14, wherein the first composite background image is a looped video image that replays itself to create a live video effect.

18. The apparatus of claim 14, wherein the first video image is superimposed over the first composite background image.

19. The apparatus of claim 18, wherein the first video image includes one or more visual features, wherein the first composite background image includes one or more visual features, and wherein integrating the first video image with the first composite background image includes aligning at least some of the one or more visual features of the first video image with matching visual features of the first composite background image.

20. The apparatus of claim 14, wherein one or more foreground objects are extracted from the first video image, and wherein the one or more foreground objects extracted includes one or more participants of the video communication session.

21. The apparatus of claim 20, wherein the one or more participants are automatically recognized using one or more of facial recognition algorithms or human recognition algorithms.

22. The apparatus of claim 21, wherein the one or more participants are manually identified by a participant of the video communication session.

23. The apparatus of claim 14, further comprising:
capturing a second set of one or more background images;
combining at least some of the second set of one or more background images with the first composite background image to create a second composite background image having a field of view that is greater than the second field of view;
superimposing at least a portion of the first video image over the second composite background image to form a second video image having a same field of view as the second composite background image; and
transmitting the second video image during the video telecommunication session.

* * * * *